Feb. 19, 1929.
R. G. McKEE
1,702,877
CLEAR VISION DEVICE FOR WINDSHIELDS
Filed Dec. 23, 1927
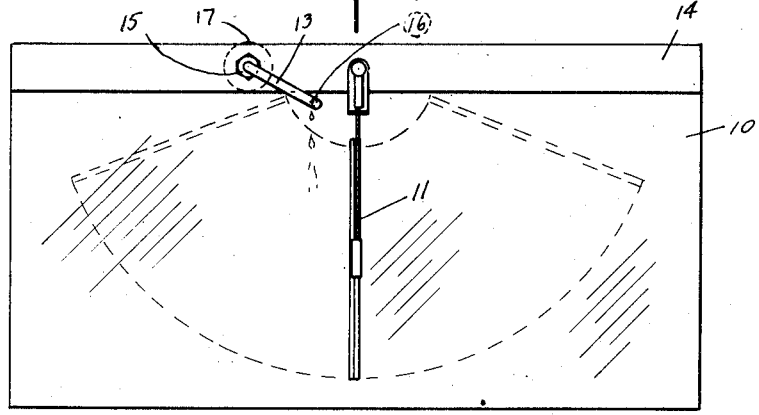
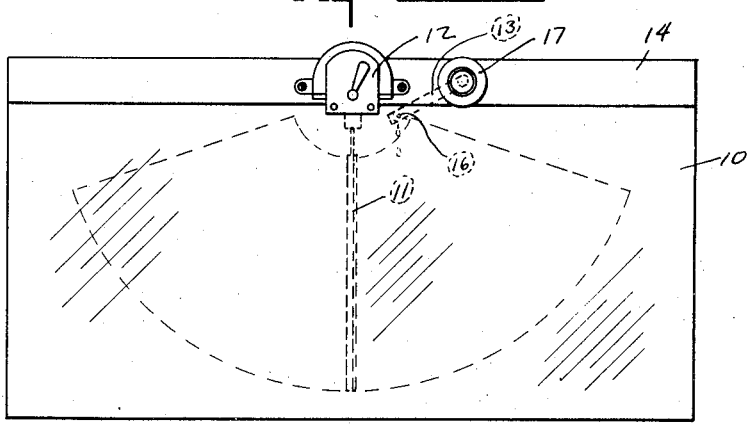
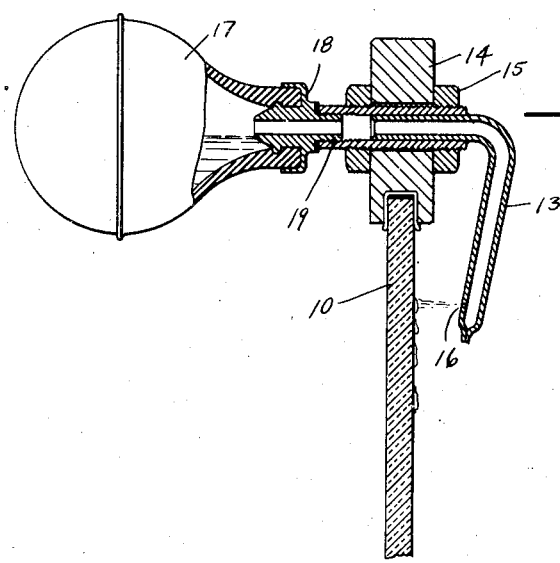
INVENTOR.
ROBERT G. McKEE.
BY
ATTORNEYS.

Patented Feb. 19, 1929.

1,702,877

UNITED STATES PATENT OFFICE.

ROBERT G. McKEE, OF INDIANAPOLIS, INDIANA.

CLEAR-VISION DEVICE FOR WINDSHIELDS.

Application filed December 23, 1927. Serial No. 242,148.

This invention relates to the application of a non-freezing substance on the exterior surface of a windshield or the like for maintaining clear vision under rainy, sleeting and freezing conditions.

The principal feature of the invention resides in the process and apparatus for conveniently applying such substance to the exterior surface of the windshield from the interior of the vehicle in such fashion as to permit the usual windshield wiper to catch the substance and distribute it evenly over the surface. This is accomplished by providing a reservoir for containing the substance within the interior of the vehicle, which reservoir may be collapsed or otherwise reduced in capacity for forcing the substance through the top framework of the windshield and cause it to be discharged on the exterior surface thereof in the path of the sweep of the usual wiper.

By means of this arrangement, a sufficient quantity of glycerin or similar non-freezing substance may be contained in the reservoir to probably last throughout a season, it being only necessary to force a few drops thereof onto the windshield to make it immediately effective and usually lasting throughout the drive. Such substance is adapted, when spread over the surface by the wiper in the form of a thin film, to cause any rain or sleet striking the windshield to pass therefrom without leaving any marked visible effect, and thus preventing any possibility of accumulation thereof becoming frozen. After the windshield wiper has spread the proper film of the substance, it is thereafter unnecessary to continue the constant action of the wiper, and by reason of the cleanness of the substance, unobstructed vision is obtained.

The substance also acts as a lubricant for the wiper in its movement over the surface of the shield, preventing squeaking and undue resistance, while at the same time preserving and lengthening the life of the rubber squeegee.

The full nature of the invention will be understood from the accompanying drawings and the following description and claims:

In the drawings, Figure 1 is a front elevation of a windshield showing the device applied thereto. Fig. 2 is a rear elevation of the windshield. Fig. 3 is an enlarged cross section through the upper portion of the windshield and the device mounted thereon.

In the drawings there is shown a windshield 10 upon which is mounted the usual windshield wiper 11 with a power drive control 12 adapted to cause said wiper to swing through a sufficient arc to maintain a section of the windshield clear of rain, sleet or snow. However, the principal difficulty with respect to clear vision in the use of such wipers is that in freezing weather a film is spread over the surface if the windshield thereby, which becomes frozen and thus prevents any vision through the windshield and often resulting in serious accidents. In non-freezing weather, vision is impaired to some extent by the continuous action of the wiper across the line of vision and the accumulation of rain, sleet or snow thereon between successive swipes of the wiper.

The apparatus comprises a tube 13 adapted to extend through the top frame part 14 of the windshield and be secured in position therein by the nuts 15. The discharge nozzle 16 is positioned in close proximity to the windshield near the top thereof, as shown in Fig. 1. Detachably connected with the tube 13 there is a reservoir, shown herein as a collapsible bulb 17, to which is secured, by the cap 18, a nozzle 19 which is secured to the inner end of the tube 13.

By reason of this arrangement, the vehicle may be supplied with more than one reservoir filled with a non-freezing, transparent substance, such as glycerin or the like, and a suitable cap attached over the end of the nozzle 19 to prevent the escape thereof when not attached to the tube. When it is desired to use the same, it may be connected in place with the tube 13, although if desired it may be maintained in that position continually until emptied. The substance contained therein, when used, is forced through the tube 13 to the extent of a few drops which engage on the windshield in the path of movement of the wiper 11 so as to be spread thereover in a thin film. While the reservoir 17 is herein shown as a collapsible bulb, it may be in any other suitable form adapted to have its capacity decreased for forcing the substance therefrom.

The invention claimed is:

1. In a device for cleaning a vehicle windshield, means for applying to the exterior surface thereof a transparent, non-freezing, liquid including a discharge tube extending through the upper frame portion of the windshield and having its discharge end positioned adjacent the surface of said shield exteriorly of the vehicle, and a force feed member positioned within said vehicle and detachably connected with said tube adapted to contain a quantity of said liquid and force said liquid through the tube onto the exterior surface of the windshield.

2. In a device for cleaning a vehicle windshield a movable windshield wiper mounted thereon adapted to engage and sweep over an area of the exterior surface thereof, means for applying a transparent, non-freezing, liquid to the exterior of said windshield in the path of movement but independently of said wiper so as to cause said wiper to engage and spread said liquid in a thin film over the exterior surface of the windshield covered thereby, including a discharge tube extending through the upper frame portion of the windshield having its discharge end positioned adjacent the surface of said shield exteriorly of the vehicle, and a force feed member positioned on the other side of said shield and detachably connected with said tube adapted to contain a quantity of said liquid and force said liquid through the tube onto the exterior surface of the windshield.

In witness whereof, I have hereunto affixed my signature.

ROBERT G. McKEE.